A. W. CHILCOTT.
MOUSING-HOOKS.

No. 186,988. Patented Feb. 6, 1877.

WITNESSES:
E. Wolff.
J. H. Scarborough

INVENTOR:
A. W. Chilcott
BY
ATTORNEYS.

UNITED STATES PATENT OFFICE.

AMON W. CHILCOTT, OF CASSVILLE, PENNSYLVANIA.

IMPROVEMENT IN MOUSING-HOOKS.

Specification forming part of Letters Patent No. 186,988, dated February 6, 1877; application filed November 18, 1876.

*To all whom it may concern:*

Figure 1:
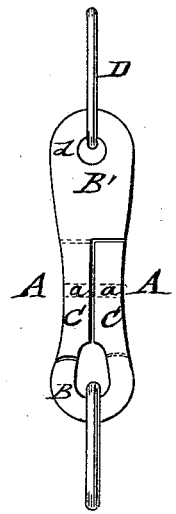
Figure 2:
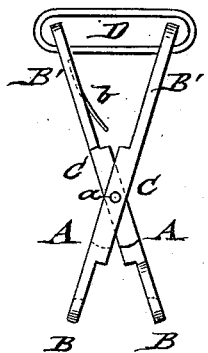
Figure 3:
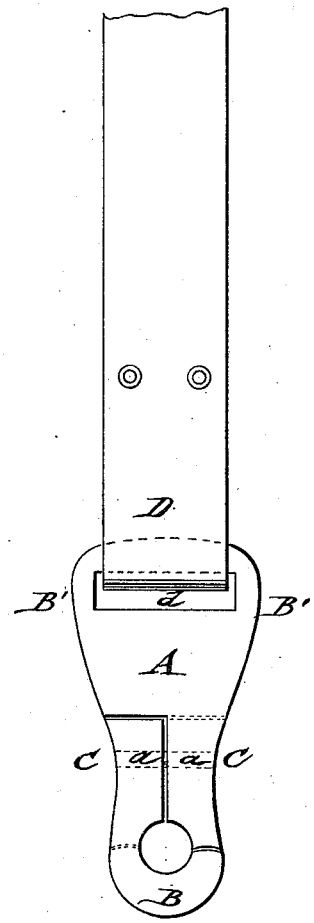

Be it known that I, AMON W. CHILCOTT, of Cassville, county of Huntingdon and State of Pennsylvania, have invented a new and Improved Mousing-Hook, of which the following is a specification:

In the accompanying drawing, Figure 1 represents a side view, and Fig. 2 an end view, of my improved mousing-hook, being shown, respectively, in closed and opened position, and Fig. 3 shows a hook of larger size, as applied to traces, for being attached to hames, whiffletrees, and similar objects.

Similar letters of reference indicate corresponding parts.

The invention relates to a simple, durable, and strong mousing-hook or lever-hook fastener, for attaching traces to hames, connecting reins with bridle-bits, uniting railroad-signal cords, also for attaching watch-chains to watches, and for similar purposes; and the invention consists of two fulcrumed lever-hooks that are applied by perforations or slots of the overlapping plates at one end to the trace, chain, or strap, and at the other end by overlapping hooks to the ring or eye, the hook-ends and upper plates being recessed to one-half the thickness of their shanks at the fulcrum to form a mousing-hook when closed, and be readily spread open for being detached.

In the drawing, A represents the lever-hooks that compose my improved mousing-hook. The lever-hooks A are fulcrumed at their shanks C to a pivot-pin, $a$, sidewise of each other, and enlarged at the upper parts to form overlapping plates B', which are recessed to half the thickness of the shanks, so as to form, when bearing on each other, the regular thickness of the snap-hook. The end hooks B are also recessed to half the thickness of the shanks C, and curved in opposite directions to each other, forming, when closed, a hook equal in thickness to the shanks.

By spreading the overlapping plates B' apart the hooks are opened, and then readily detached from the ring eye or other device, to which they are applied. When the hook is applied to the end of a chain a spring, $b$, may be interposed between the overlapping plates B', so that the same are spread open when the link D of the chain is placed into position transversely or at right angles to the plates, as seen in Fig. 2. The link D is passed through holes $d$ of the plates B', and keeps the same tightly closed when placed in the direction of the longitudinal axis of the hook, as shown in Fig. 1.

When the hook is to be attached to a leather brace or strap, D, slots $d$ in place of the holes are arranged in the overlapping plates B', and the trace or strap then stitched at such distance from the hook as to admit the spreading open of the same, when placed at right angles to the strap or brace.

When the hook ends are applied to the required object, and the chain or trace placed longitudinally to the same, the hooks and plates close tightly to each other and lock the tighter the greater the strain thereon. The hook has no chance to open itself, and forms a strong, durable, and reliable connecting and fastening device for the purposes mentioned.

Having thus described my invention, I claim as new and desire to secure by Letters Patent—

A mousing-hook consisting of two pivoted levers, A A, having at one end recessed hooks B B, and at the opposite end recessed loops B' B', adapted to close upon each other and form a solid hook and loop, substantially as shown and described.

AMON W. CHILCOTT.

Witnesses:
AMON W. BROWNE,
A. H. EVANS.